United States Patent Office 2,875,256
Patented Feb. 24, 1959

2,875,256

DIENIC HYDROCARBONS AND DERIVATIVES THEREOF

Julius Hyman, Tallahassee, Fla., and Ernest Freireich and Rex E. Lidov, Denver, Colo., assignors to Shell Development Company, Emeryville, Calif., a corporation of Delaware No Drawing. Application January 21, 1953
Serial No. 332,552

4 Claims. (Cl. 260—666)

This application is a continuation-in-part of our co-pending application Serial No. 45,574 filed April 21, 1948, now abandoned.

This invention relates to new compositions of matter and methods and processes for their preparation.

More specifically, this invention relates to unsaturated hydrocarbons and certain of their derivatives neither heretofore known nor known to be capable of existence, possessing unique reactivities and valuable in themselves and as intermediates in the synthesis of a large number of valuable new pure chemicals and polymers.

One object of this invention is the preparation of new unsaturated hydrocarbons.

Another object of this invention is the preparation of insecticidally active hydrocarbons.

Another object of this invention is the production of hydrocarbons possessing valuable characteristics in the preparation of stable, highly active halogenated insecticides.

Still another object of this invention is the preparation of unsaturated hydrocarbons useful for the production of a variety of polymeric materials.

Further objects of this invention are the methods and processes to be employed in producing these valuable unsaturated hydrocarbons and their derivatives.

A still further object is the provision of a continuous process for producing the new compositions of matter comprehended by this invention.

Other objects, features, capabilities and advantages are comprehended by the invention, as will later appear and as are inherently possessed thereby.

The Diels-Alder diene synthesis is well known and has proved applicable for the preparation and manufacture of a large number and variety of compounds. In general many kinds of dienes, reacting with a great diversity of unsaturated compounds, have been employed for this purpose. Specifically, the reaction of non-cyclic dienes with some acetylenic hydrocarbons is known. Except, however, in a very limited number of cases of a special class, to be defined hereinafter, the reaction of cyclic dienes, such as cyclopentadiene, and its derivatives, with acetylene has not heretofore been accomplished.

We have now discovered conditions such that cyclopentadiene and mono-methyl substituted cyclopentadienes can be readily caused to react with acetylene to form 1:1 Diels-Alder adducts thereof, as represented by the following:

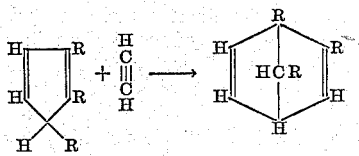

where all R's are hydrogen, or where only one R is a methyl radical and the others are hydrogen.

Thus, reaction of cyclopentadiene with acetylene results in the 1:1 adduct bicyclo-(2.2.1)-2,5-heptadiene, and similarly reaction of the 1-methyl, 2-methyl and 5-methyl substituted cyclopentadienes with acetylene results in the 1-methyl, 2-methyl and 7-methyl bicyclo-(2.2.1)-2,5-heptadienes, respectively.

Although acetylene is known to decompose explosively when subjected to elevated temperatures and pressures, we have unexpectedly found in accordance with the present invention that the aforementioned novel bicycloheptadienes can be prepared by reacting together acetylene and a cyclopentadiene in a dynamic system, namely one in which the reactants are caused to flow through a reaction zone maintained at proper reaction conditions, in the presence or absence of a solvent. Thus by utilizing a flowing vapor phase or mixed phase system the reaction ensues smoothly and without difficulty to form stable products.

In general, the reaction conditions for preparing the bicycloheptadienes are temperatures between about 150° to 400° C., pressures between about atmospheric and about 250 pounds per square inch gauge, and for periods of between about one minute to about fifteen minutes. A reactant ratio of about one mole of the cyclopentadiene per one to ten moles of acetylene is preferred to form the 1:1 Diels-Alder adduct.

Solvents are not required. However, a large variety can be used if desired. The solvent should be relatively inert under the conditions utilized and can be selected from ketones, alcohols, hydrocarbons, etc. Ethanol, ethyl, methyl ketone, heptane, hexane, xylene, alkylated naphthalenes, diphenyl ether and diphenyl (Dowtherm), and many others may be utilized.

The following examples are illustrative of the method for preparing the novel compounds of the present invention:

EXAMPLE I

Bicyclo-(2.2.1)-2,5-heptadiene can be readily prepared by passing cyclopentadiene and acetylene through a hot reaction zone maintained at a suitable pressure at such a rate as to provide the necessary reaction time period. The vapors issuing from the reaction zone are condensed and the desired Diels-Alder reaction product is obtained by fractionation from the recovered liquid. Table I which follows illustrates the results obtained:

Table I

| A | B | C | D | E | F | G |
|---|---|---|---|---|---|---|
| | | | Mole | | Percent 1:1 Adduct based on Weight Cyclopentadiene | |
| Run No. | T° C. | Absolute Pressure, p. s. i. | Acetylene to Moles Cyclopentadiene | Reaction Time, Minutes | Charged | Utilized |
| 177 | 319 | 39 | 1.46 | 4.5 | 7.6 | 9.4 |
| 157 | 320 | 80 | 1.43 | 1.9 | 9.9 | 14.0 |
| 163 | 314 | 103 | 0.91 | 4.7 | 12.6 | 14.5 |
| 151 | 343 | 80 | 1.98 | 2.0 | 25.0 | 32.0 |
| 190 | 288 | 80 | 1.60 | 5.7 | 3.7 | 4.2 |
| 193 | 259 | 80 | 2.1 | 14 | 7.6 | 12.3 |

The isolated product of columns F and G is a mobile liquid of characteristic odor (which suggests both chloroform and benzene) boiling between 83–84° C. at pressures between 620–635 mm. mercury, with a refractive index ranging between 1.4685 and 1.4720 at 20° and having a density between 0.8770 and 0.9100 at 20° C. Analysis of this material gives the following results:

C: 91.10% H: 8.80% Mol. wt.: 92.4

Calculated for the 1:1 cyclopentadiene-acetylene adduct, $C_7H_8$

C: 91.25% H: 8.75% Mol. Wt.: 92.13

The isolated material, while it may not be completely pure, consists essentially of bicyclo-(2.2.1)-2,5-heptadiene. This is evident from the fact that low pressure hydrogenation of the product over a Raney nickel catalyst yields, with the absorption of two moles of hydrogen, the known bicyclo-(2.2.1)-heptane.

As hereinbefore previously indicated, the formation of bicyclo-(2.2.1)-2,5-heptadiene can also be effected in the presence of a solvent. This is illustrated by the data of Example II.

EXAMPLE II

Cyclopentadiene, acetylene and a commercial mixture of diphenyl ether and diphenyl are caused to flow together through a heated reaction zone, maintained at a suitable pressure at such a rate as to provide the necessary reaction time. The vapors issuing from the reaction zone are condensed and the desired Diels-Alder reaction product is obtained by fractionation from the recovered liquid. In this experiment the reaction zone was in the form of a metal vessel maintained at the desired temperature by immersion in a heated salt bath. At the start of the experiment a portion of the space in the reaction zone was filled with the solvent mixture, and a weight of solvent equal to the weight of cyclopentadiene pumped was caused to flow continuously into the reaction zone with the reactants. Table II summarizes the results obtained.

Table II

| A | B | C | D | E | F | G |
|---|---|---|---|---|---|---|
| Run No. | T° C. | Absolute Pressure, p. s. i. | Mole Acetylene to Moles Cyclopentadiene | Reaction Time, Minutes | Percent 1:1 Adduct based on Weight Cyclopentadiene | |
| | | | | | Charged | Utilized |
| 197 | 291 | 80 | 1.78 | 8 | 27.3 | 39.2 |

It will also be expected that the yields of product obtained will vary with the magnitude of the scale on which the preparations herein described are carried out. In general, better conversions are to be expected in commercial operations than are obtained in laboratory experiments.

Thus, in pilot plant operations under conditions nominally similar to those listed in Run No. 151 of Table I above, except for a somewhat higher ratio of acetylene to cyclopentadiene and for a somewhat longer reaction time, yields of the 1:1 reaction product as high as 60–65 weight percent, based on the weight of cyclopentadiene charged, have been obtained. These yields, based on the weight of cyclopentadiene utilized are, of course, even higher.

The following is an example of a method for preparing methyl bicyclo-(2.2.1)-2,5-heptadiene:

EXAMPLE III

A methyl cyclopentadiene fraction containing 1-methyl and 2-methyl cyclopentadiene was utilized. The diene mixture and acetylene were passed through a reaction zone of a capacity of five liters and maintained at a temperature of 305° to 339° C. A pressure of about 76 pounds per square inch gauge was maintained. The charge rate for methyl cyclopentadiene was 2.78 cc. per minute. The charge rate for acetylene was 50 grams per hour. The total methyl cyclopentadiene charged was 3,500 cc., and the total time of reaction was 1,260 minutes. One fraction was recovered from the product by distillation boiling at 92–93° at 630 mm. Hg pressure. It had an analysis as follows:

| | C | H | Mol. Wt. |
|---|---|---|---|
| Analysis of material | 90.3 | 9.85 | 109 |
| Calculated for Compound III | 90.6 | 9.4 | 106 |

This product is 1-methyl bicyclo-(2.2.1)-2,5-heptadiene which when pure boils at 92.7–92.9° C. at 630 mm. Hg pressure, has a refractive index (23° C./D) of 1.4662, and density (23° C./4° C.) of 0.8755.

Another fraction was recovered by distillation boiling at 103.5° C. at 627 mm. Hg pressure. It had an analysis as follows:

| | C | H | Mol. Wt. |
|---|---|---|---|
| Analysis of material | 89.6 | 9.6 | 109 |

This produce is 2-methyl bicyclo-(2.2.1)-2,5-heptadiene which when pure boils at 103.4–103.7° C., at 630 mm. Hg pressure, has a refractive index (26° C./D) of 1.4662, and density (26° C./4° C.) of 0.8802.

In a similar manner 5-methyl cyclopentadiene may be reacted with acetylene to form 7-methyl bicyclo-(2.2.1)-2,5-heptadiene.

Example III illustrates the use of a mixture of methyl cyclopentadienes. Since it is known that in cracking a mixture of $C_4$-hydrocarbons a mixture of cyclopentadiene and methyl cyclopentadienes is obtained, such mixture may likewise be employed in the foregoing manner, and the mixed reaction product employed as such or separated into its respective components by suitable means known to the art.

These new compounds of our invention are highly valuable as chemical intermediates for the preparation of insecticides, plasticizers, plastics, solvents, and a variety of fine chemicals useful in themselves and further as chemical intermediates. These new compounds may also be themselves useful directly as insecticidal agents, solvents, and plasticizers. Certain of them have usefulness as raw materials for the manufacture of surface coating ingredients and high explosives.

The bicyclo-(2.2.1)-2,5-heptadiene of the present invention may be reacted with hexachlorocyclopentadiene to form the 1:1 Diels-Alder adduct known as aldrin, a valuable insecticide, as more particularly described and claimed in the copending application of Rex E. Lidov, Serial No. 45,573, filed August 21, 1948, now U. S. Patent No. 2,635,977. Similarly the 1-methyl bicyclo-(2.2.1)-2,5-heptadiene of the present invention may be further reacted with hexachlorocyclopentadiene to form their 1:1 Diels-Alder adduct having valuable insecticidal properties, as more particularly described and claimed in the copending application of Rex E. Lidov, Serial No. 330,166, filed January 7, 1953, now abandoned.

We claim as our invention:

1. The continuous process for preparing a bicyclo-(2.2.1)-2,5-heptadiene which comprises causing acetylene and a diene of the group consisting of cyclopentadiene, its mono-methyl derivatives, and mixtures thereof in mole ratios between one to one and ten to one to flow together through a reaction zone maintained at a temperature between 150° C. and 400° C. and a pressure between about atmospheric to about 250 pounds per square inch gauge at a rate to cause the reactants to remain in the reaction zone for a period of between about one to about fifteen minutes thereby producing the Diels-Alder adduct formed by the reaction of one mole of said diene with one mole of acetylene.

2. The continuous process for preparing 1-methyl bicyclo-(2.2.1)-2,5-heptadiene which comprises causing acetylene and 1-methyl cyclopentadiene in mole ratios between one to one and ten to one to flow together through a reaction zone maintained at a temperature between 150° C. and 400° C. and a pressure between about atmospheric to about 250 pounds per square inch gauge at a rate to cause the reactants to remain in the reaction zone for a period of between about one to about fifteen minutes thereby producing the Diels-Alder adduct formed by the reaction of one mole of said diene with one mole of acetylene.

3. The continuous process for preparing a new composition of matter which comprises causing cyclopentadiene and acetylene in mole ratios between one to one and one to ten to flow together through a reaction zone maintained at a temperature lying between 250 and 375° C. and a pressure lying between 30 and 150 pounds per square inch gauge at such a rate as to cause the reactants to remain in the reaction zone for a period of time lying between one and about fourteen minutes, both inclusive, and separating from the recovered reaction mixture the Diels-Alder adduct formed by the reaction of one mole of cyclopentadiene with one mole of acetylene.

4. The continuous process for preparing a new composition of matter which comprises causing cyclopentadiene and acetylene in mole ratios between one to one and one to ten and a high boiling solvent material which will remain at least partly in liquid phase under the conditions prevailing in the reaction zone to flow together through a reaction zone maintained at a temperature lying between 250 and 375° C. and a pressure lying between 30 and 150 pounds per square inch gauge at such a rate as to cause the reactants to remain in the reaction zone for a period of time lying between one and about fourteen minutes, both inclusive, and separating, by fractionation of the recovered reaction product the liquid hydrocarbon material boiling between 83° C. and 84° C. at 620–635 mm. mercury pressure, having a refractive index lying between 1.4685 and 1.4720 at 20° C. and a density lying between 0.8770 and 0.9100 at 20° C.

References Cited in the file of this patent

UNITED STATES PATENTS 2,352,606    Alder et al. _____ July 7, 1944

OTHER REFERENCES

Patterson et al.: "The Ring Index," p. 110 (1940).

Joshel et al.: "Jour. Amer. Chem. Soc.," vol. 63, pp. 3350–1 (1941).

Norton et al.: "Chemical Reviews," vol. 31, pp. 387–92 (1942).